No. 740,161. PATENTED SEPT. 29, 1903.
M. B. MILLS.
BLOW TESTING MACHINE.
APPLICATION FILED APR. 27, 1903.
NO MODEL. 4 SHEETS—SHEET 1.

Witnesses:
Inventor:
Mortimer B. Mills,
By Dyrenforth, Dyrenforth & Lee
Att'ys

No. 740,161. PATENTED SEPT. 29, 1903.
M. B. MILLS.
BLOW TESTING MACHINE.
APPLICATION FILED APR. 27, 1903.
NO MODEL. 4 SHEETS—SHEET 2.

Witnesses:
Inventor:
Mortimer B. Mills,
By Dyrenforth, Dyrenforth & Lee,
Att'ys.

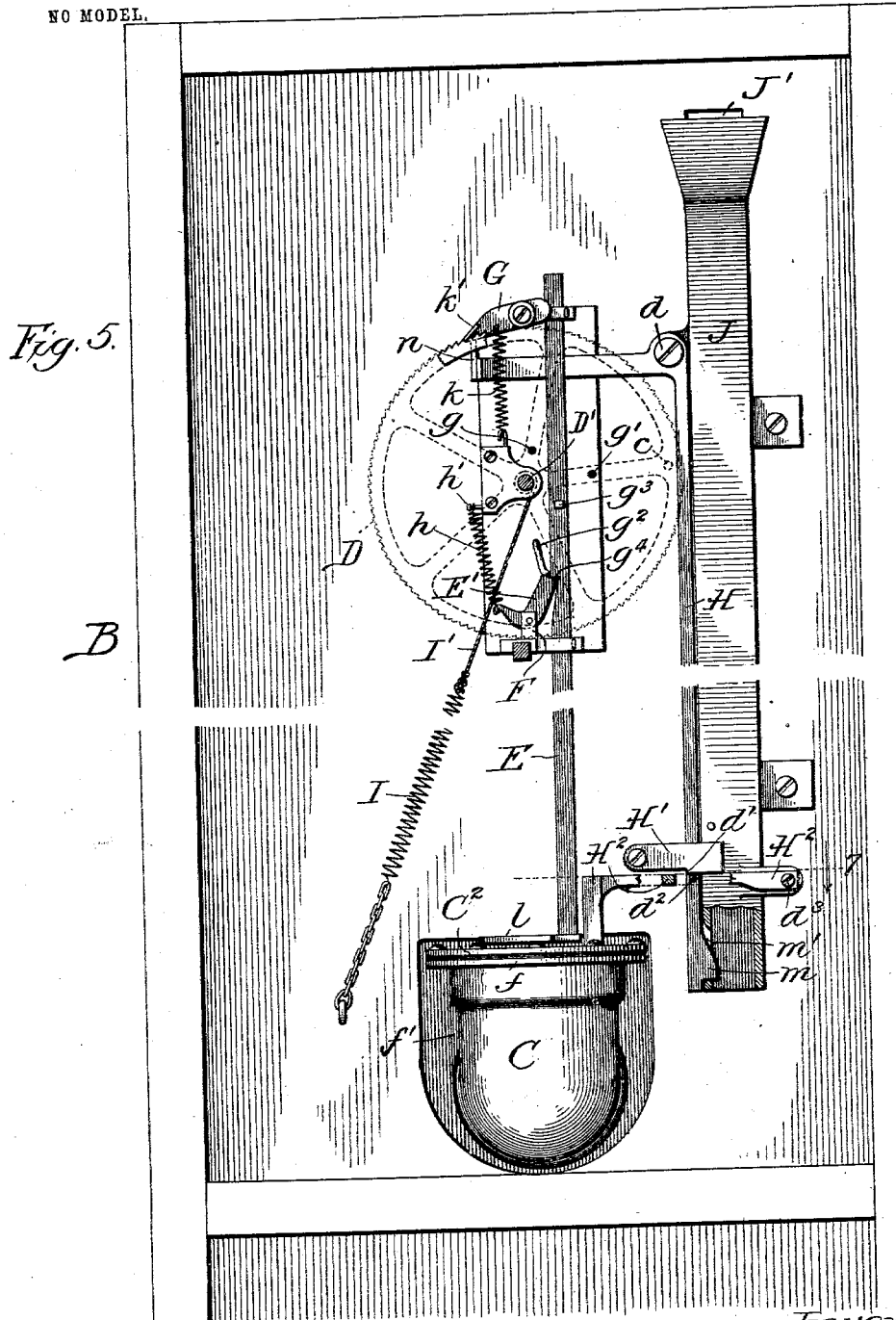

No. 740,161. PATENTED SEPT. 29, 1903.
M. B. MILLS.
BLOW TESTING MACHINE.
APPLICATION FILED APR. 27, 1903.
NO MODEL. 4 SHEETS—SHEET 4.

Witnesses:
Inventor:
Mortimer B. Mills,
By Dyrenforth, Dyrenforth & Lee,
Att'ys

No. 740,161. Patented September 29, 1903.

UNITED STATES PATENT OFFICE.

MORTIMER B. MILLS, OF CHICAGO, ILLINOIS, ASSIGNOR TO HERBERT S. MILLS, OF CHICAGO, ILLINOIS.

BLOW-TESTING MACHINE.

SPECIFICATION forming part of Letters Patent No. 740,161, dated September 29, 1903.

Application filed April 27, 1903. Serial No. 154,470. (No model.)

*To all whom it may concern:*

Be it known that I, MORTIMER B. MILLS, a citizen of the United States, residing at Chicago, in the county of Cook and State of Illinois, have invented a new and useful Improvement in Blow-Testing Machines, of which the following is a specification.

My invention relates particularly to machines for testing fist-blows, although the invention may be usefully applied to other similar purposes.

My primary object is to provide a machine of simple construction and improved operation, particular attention being paid to securing a machine which will register accurately the force of a sharp blow, but which will be affected very little by a shoving blow. In other words, the machine is designed to register the effective forces of blows, giving a true test of the power of the blows.

The invention is illustrated in the accompanying drawings, in which—

Figure 1:
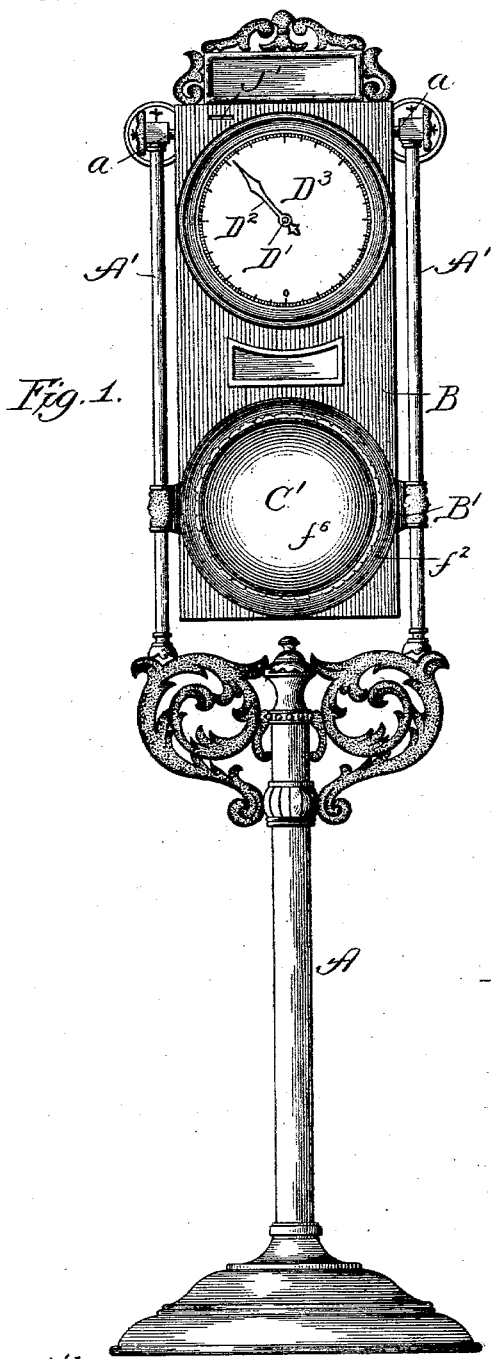
Figure 2:
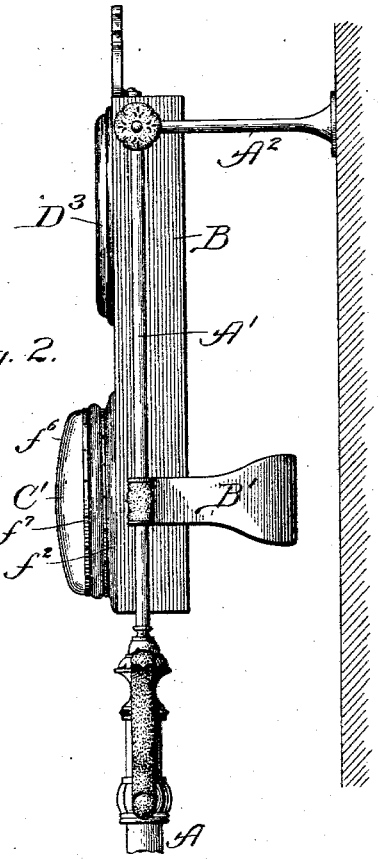
Figure 3:
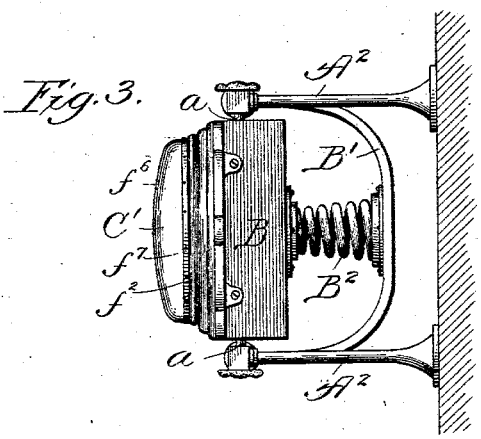
Figure 4:
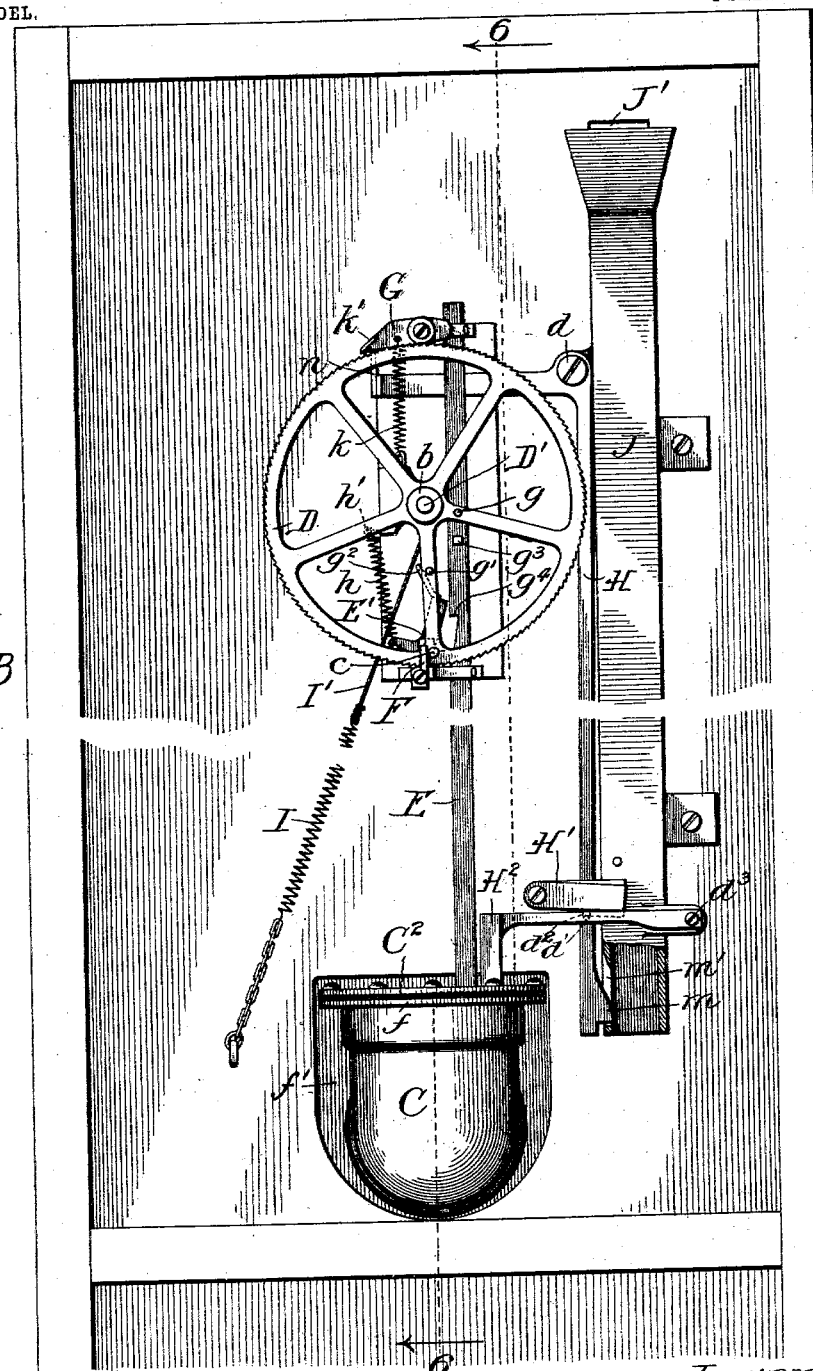
Figure 7:
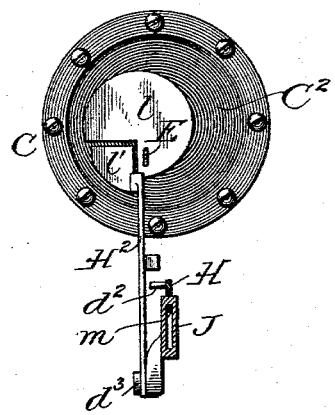
Figure 6:
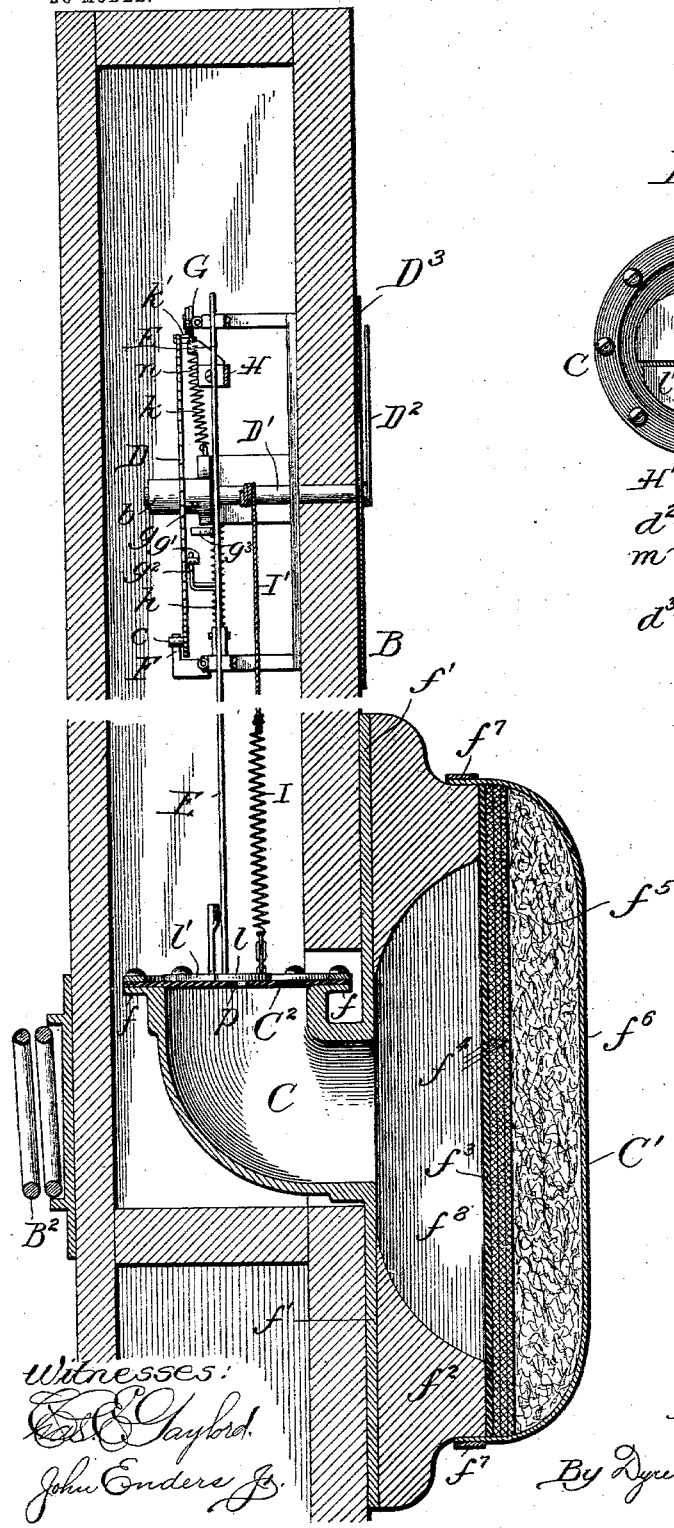

Figure 1 represents a front view of my improved blow-testing machine; Fig. 2, a side view of the upper portion of the same; Fig. 3, a top plan view of the same; Fig. 4, an inner view of the casing, the rear plate being removed and the mechanism shown in the position which it occupies preparatory to the striking of a blow; Fig. 5, a similar view showing the parts of the mechanism in the position which they occupy after a blow has been struck, the main portion of the ratchet-wheel being broken away and the outline thereof indicated by dotted lines; Fig. 6, a broken vertical sectional view taken as indicated at line 6 of Fig. 4, and Fig. 7 a view taken as indicated at line 7 of Fig. 5.

A description of the preferred construction is as follows: A represents a suitable stand or frame having its upper portion provided with vertical frame members A'; A², bracket-arms secured to a wall and connected with the upper ends of the members A'; B, a casing connected at its upper end by pivots $a$ with the upper ends of the frame members A'; B', a curved bracket or yoke having its ends connected with the members A'; B², a spring confined between the rear lower portion of the casing and the bracket B'; C, an air-chamber comprising an elbow having a free upwardly-turned end and a forwardly-turned end rigidly connected with the casing-front; C', a blow-receiving head or cushion; C², a diaphragm connected with the inner upturned end of the elbow forming the chamber C; D, a ratchet-wheel or inertia-carried rotary member having a shaft D' journaled in the casing-front and in a suitable bearing $b$, supported from the casing; D², an indicator-hand carried by the shaft D' and moving over a dial D³; E, a diaphragm-actuated bar or member serving to actuate the wheel D; E', a dog serving to lock the member E in its elevated position; F, a stationary stop for the ratchet-wheel, with which engages a stud $c$, carried by the ratchet-wheel; G, a pawl engaging the ratchet-wheel; H, a bell-crank lever supported on a pivot $d$ and serving to release the pawl G, said bell-crank lever being preferably coin-actuated; H', a latch provided with a shoulder $d'$ for engaging a stud $d^2$ with which the lower end of the lever H is provided; H², a diaphragm-actuated arm supported on a pivot $d^3$ and serving to release the latch H', and I a spring connected at one end with the casing and at its other end with a cable I', wrapped upon and firmly secured to the shaft D'.

The frame of the machine may be of any suitable construction and design, as also may be the casing. The elbow forming the air-chamber C preferably is provided at its upturned end with a flange $f$, with which the diaphragm C² is connected, and at its forwardly-turned end with a larger flange $f'$, which is firmly connected with the casing. The elbow extends through an opening in the lower portion of the casing-front, as clearly shown in Fig. 6. Connected with the annular flange or plate $f'$ is a ring $f^2$, which may be of wood. Attached to the ring $f^2$ is a pad, which may comprise a sheet of rubber $f^3$, sheets of felt $f^4$, a packing of hair $f^5$, and a cover of leather $f^6$, the whole being securely fastened to the ring $f^2$ by a ferrule $f^7$. The construction provides an air-space $f^8$ in free communication with the air-chamber C, and hence with the under side of the diaphragm C². The ratchet-wheel D has in addition to the stud $c$ a stud $g$, through the medium of which the wheel is actuated, and a stud $g'$ which serves to engage an arm $g^2$ on a dog E' and release the same when the ratchet-wheel returns to the zero position. The stud $g$ is in the path of a stud $g^3$ with which the member E is provided. The member E is further provided with a shoulder $g^4$, with which the dog E' engages in the elevated position of the member E. The dog E' is held in the locking position by a spring $h$, connected therewith and with a stationary stud $h'$. The spring $k$ tends normally to hold the pawl G in engagement with the teeth of the ratchet-wheel, said pawl being provided with a tooth $k'$ for engaging said teeth. The bar E is provided at its lower end with a flat head $l$, which bears upon the diaphragm $C^2$, and the arm $H^2$ has a downturned end equipped with a head $l'$, which bears upon the diaphragm. The lever H may be actuated in any suitable manner to release the pawl G. Preferably it is provided at its lower end with a cam $m$, which enters a slot $m'$ at the lower end of a coin-chute J, which communicates with the external surface of the casing-front by means of a coin-slot $J'$.

The operation of the machine will readily be understood from the foregoing detailed description. Assuming the machine to be in a condition of rest with the pointer $D^2$ at zero and the bar E and arm H resting upon the diaphragm, a sharp blow upon the head $C'$ will cause a movement of the diaphragm $C^2$, throw the bar E and arm $H^2$ upwardly, unlock the bell-crank lever H, and cause the stud $g^3$ to strike the stud $g$ of the ratchet-wheel, thereby imparting rotation to the ratchet-wheel. The pawl G locks the ratchet-wheel in the position to which it is carried by the inertia which it acquires under the force of the blow imparted to it. As the ratchet-wheel rotates away from its position of rest the pin $g'$ is carried away from the projection $g^2$ of the dog E', permitting the dog to operate to lock the bar E in its elevated position. When it is desired to operate the machine again, it is necessary to drop a coin into the coin-chute, thereby actuating the lever H and elevating the pawl G. This permits the ratchet-wheel to return to its former position, during which movement the pin $g'$ releases the dog E', permitting the bar E to fall and rest again upon the diaphragm. When the lever H is actuated by the coin, the latch H' engages the stud $d^2$ of the lever, thereby causing the pawl G to be held in its elevated position. When another blow is struck, the bar E and arm $H^2$ are again thrown upwardly simultaneously, the latch H' is released, and the wheel D rotated. The lever H being left free by its release from the latch H', permits the pawl G to engage the ratchet-wheel again, thereby preventing retraction of the ratchet-wheel until a further coin is introduced.

It is noteworthy that the member E serves to impart a sharp blow to the rotary member D, the stud $g^3$ having contact during a brief period of time only with the stud $g$, after which the stud $g$ passes out of the path of the stud $g^3$. Experiment has shown that the air acts in a peculiarly effective manner to actuate the member E under the stress of a sharp blow, while a pushing blow will have little effect upon the mechanism. To further differentiate the action of a sharp blow from a pushing blow, the diaphragm $C^2$ is preferably provided with a small perforation $p$, which is insufficient in size to permit much of the air to escape when a sharp blow is struck, while the air may escape in large quantity when a slow blow is struck.

It readily will be understood that the gist of the invention lies in the provision for utilizing the air as a transmission medium under the stress of a sharp blow, while under the stress of a slow blow the air serves as a poor transmission medium.

It will be understood that changes in details of construction within the spirit of my invention readily may be made by those skilled in the art. Hence no undue limitation should be understood from the foregoing detailed description, the same having been given for clearness of understanding only.

What I regard as new, and desire to secure by Letters Patent, is—

1. In a blow-testing machine, the combination of a suitable indicator, and pneumatic actuating means therefor, including a suitable air-chamber provided with a vent, a member actuated through the medium of the air in said chamber, and a yielding blow-receiving member connected with said air-chamber, for the purpose set forth.

2. In a blow-testing machine, the combination of a suitable indicator, and pneumatic actuating means therefor comprising a vertically-movable member, an air-chamber provided with a diaphragm serving to actuate said member, and a blow-receiving head connected with said chamber and arranged at substantially right angles to said diaphragm.

3. In a blow-testing machine, the combination of an indicator, a ratchet device connected therewith, locking means for holding the pawl of the ratchet device disengaged, a pneumatically-actuated diaphragm, means connected therewith for actuating the indicator, and means connected with the diaphragm for disengaging the pawl-locking means.

4. In a blow-testing machine, the combination of a blow-receiving rotary member equipped with an indicator, a blow-imparting member for striking said rotary member, and pneumatic means for supporting and actuating said blow-imparting member, said blow-imparting member seating loosely upon said pneumatic means.

5. In means of the character described, the combination of a yieldingly-held ratchet-wheel equipped with an indicator, a pawl serving to engage said ratchet-wheel, a pawl-locking lever, a latch therefor, a member for releasing said latch, a member for imparting motion to said ratchet-wheel, and pneumatic means for actuating said last-named two members, for the purpose set forth.

6. In means of the character described, the combination of a suitable indicator, a reciprocable member serving to actuate the same, a dog for locking said member, pneumatic actuating means for said member, and releasing means, for the purpose set forth.

7. In a machine of the character described, the combination of a ratchet-wheel equipped with an indicator, a vertically-reciprocable striking member, a dog for locking the same in the elevated position, a pawl for engaging the ratchet-wheel, a bell-crank lever having one arm for engaging said pawl and another arm extending parallel with said reciprocable member, a latch for the last-named arm of said lever, a releasing member for said latch, and pneumatic means for simultaneously actuating said latch-releasing member and said striking member.

8. In a machine of the character described, the combination of a suitable indicator, and pneumatic actuating means therefor, including an air-chamber equipped with a horizontally-disposed diaphragm from which the indicator is actuated and a vertically-disposed flexible blow-receiving head, for the purpose set forth.

9. In a blow-testing machine, the combination of a suitable frame, a casing pivotally connected at its upper end with said frame, a spring confined between said frame and the lower portion of said casing, a blow-receiving head connected with the lower portion of the casing, an indicator, an indicator-actuating mechanism housed by said casing and actuated from said head, for the purpose set forth.

MORTIMER B. MILLS.

In presence of—
WALTER N. WINBERG,
W. B. DAVIES.